Patented Nov. 15, 1927.

1,649,058

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL SHEET AND PROCESS OF PRODUCING THE SAME.

No Drawing.   Application filed March 26, 1924.   Serial No. 702,147.

The invention relates particularly to stencil sheets of the sort adapted to be stencilized by pressure (i. e., that of a stylus or the type of a writing machine) and constitutes an improvement in various respects, some of which are hereinafter noted, upon stencil sheets of such character now on the market in which is employed a paper base, commonly of open, porous material, having a type-impressible coating as of wax or waxy mixtures, coagulated protein and the like. The invention is based upon the discovery that synthetic resin, dissolved in suitable solvents and combined with modifying agents of certain character, constitutes a highly efficient coating for stencil sheets, possessing important characteristics heretofore unknown in the art. Such resin is a complex, amorphous, organic, solid or semi-solid material approximating natural resins in various physical properties but commonly differing therefrom in chemical constitution and behavior with re-agents. Stencil sheets employing in their coating tempered or modified synthetic resins possess the important advantages of flexibility, toughness and durability. Such sheets are characterized by great stability, particularly when, as is preferred, the synthetic resins employed are such as are prepared at high temperatures and from materials which are unaffected by bacteria or molds, as are the proteins, or which in themselves possess antiseptic or germicidal properties preventing decomposition. Additionally, such resins are exceedingly stable at ordinary temperatures, unaffected by light, by the oxygen of the air or by long exposure. They are non-volatile, generally odorless and, in many instances, only slightly inflammable.

While synthetic resins in general are made by a great variety of processes and are of a very widely varying chemical nature, most of them differ materially from natural resins in that they are organic condensation products, two or more substances entering into union with each other in their formation, usually at an elevated temperature. The condensation products are formed not only by union, with the elimination of water, but also by the coupling of one or more so-called "double bonds" in the organic structure, thus yielding compounds which, while possessing many of the properties of natural resins, such as solubility in organic solvents, and withstanding the action of air and moisture over long periods, yet are not related chemically and are not in the same organic series. Furthermore, while the properties of natural resins are quite constant and distinct, and the various kinds do not vary materially, the same natural resin always possessing approximately the same properties, this is not true of the synthetic resins, their properties varying materially with the character and proportion of ingredients used in the condensation, and their solubility varying greatly with the degree of temperature applied and length of time used in condensing the constituents. The synthetic resins therefore are well adaptable to the production of stencil coatings, since such properties as solubility in organic solvents, degree of tack, melting point and the like can be definitely controlled by suitable variations in the formulas employed.

I have found that synthetic resin solutions lend themselves well to incorporation with many other desirable ingredients; thus, solutions of oils, fats and waxes may be incorporated with solutions of certain synthetic resins, or such products as solutions of nitro-cellulose or other cellulose esters may be added to synthetic resin solutions, all making a homogeneous mass which may readily be applied to a stencil sheet base. Some synthetic resins may be simply melted with their modifying agents and the paper coated in the usual manner while, in other instances, the character of the resin and of the modifying agents is such that the entire mass is best dissolved in a volatile solvent or solvents, the paper being drawn over or through the resulting solution and the coating completed by the evaporation of the volatile solvent.

Synthetic resin suitable for use hereunder may be prepared producing a condition of permanent stability as, for example, by the union of aldehydes with phenols, by the union of acid anhydrides with esters or polyhydric alcohols, by the condensation of aldehydes with amines, by the polymerization of unsaturated hydrocarbons, by the condensation of ketones, either with themselves or other products. With the synthetic resin I incorporate tempering and modifying agents the character of which may be varied within substantial limits dependent upon the particular form of such resin employed. Most synthetic resins in their stable and pure form are too hard and brittle for stenciling unless their structure is modified by incorporating therewith agents adapted to distend, soften or weaken the mass. Those substances which distend are referred to herein as tempering agents; and those substances which alter the mass in other respects, such as softening or lubricating or plasticizing the mass to permit the same to be stencilized more readily, are called modifying agents. As a tempering agent, I prefer to employ a non-volatile fluid such as castor oil. Additionally, I may employ substances which tend to soften, or to lubricate or to reduce the viscosity of the mass, such as Japan wax, paraldehyde and the like; also a suitable plasticizer, preferably a halogenated hydro-carbon such as chlorinated naphthalene. Also I may add, as an additional modifier, a suitable solution of a cellulose derivative, which will be readily miscible with the other ingredients to form a homogeneous mass at ordinary temperatures.

By way of example, one method by which my invention may be practised is as follows: I first prepare a synthetic resin, using about 200 parts of phthalic anhydride and 100 parts of glycerin. These are mixed and heated for one hour at approximately 185° C. The temperature is then raised slowly to about 210° C. and held there until a sample, on cooling, gives a clear, brittle, yellowish resin which is almost without tack and is no longer sticky. I then dissolve the resin in acetone to make a ten percent solution and to about 225 c. c. of such solution I add about 45 c. c. of castor oil, about 30 gm. of chlorinated naphthalene, about 15 gm. of Japan wax and about 15 c. c. of paraldehyde. Also, if desired, I may add a suitable proportion of cellulose in one of its many forms as, for example, 250 c. c. of nitro-cellulose, five per cent solution, in a half and half mixture of ethyl acetate and acetone. After compounding, the mixture is thoroughly stirred, whereupon it readily makes a homogeneous, semi-fluid mass at ordinary temperature.

In coating the basic material, as, for instance, porous paper such as yoshino, the usual process may be followed, that is, the material may be floated or "drawn" over the surface of the solution in a shallow pan and hung for a time to allow the volatile solvents to evaporate. If desired, the sheet after being drawn through or over the solution may be passed over a wire to remove the excess solution from the surface. After the major portion of all of the volatile solvents have evaporated the sheet will be found completely coated, all the pores being filled and the coating being of such character as to be readily stencilized as by a stylus or the type of a writing machine. Stencils so made will yield a large number of copies when used upon a suitable duplicator.

Other synthetic resins may be substituted for the phthalic anhydride-glycerin resin above specified and quite similar formulas may be employed in compounding. Other tempering agents may also be employed but, if so, they should be substantially non-volatile and capable of combining with the other ingredients to form a homogeneous mass. Also, any of the modifying agents above specified may be omitted and replaced by others in accordance with variations in the character of the synthetic resin employed. The cellulose ingredient may be replaced by other substances, particularly when using certain sorts of resins. Accordingly, save where, in the sub-joined claims, the contrary is clearly indicated, as by express words, the invention in its broad aspect is unlimited with respect to the character of any of the ingredients beyond the fact that, essentially, the coating solution hereof is one which employs synthetic resin in a suitable form.

It is appreciated that it has been proposed to use in the production of stencil sheets, an incompletely polymerized synthetic resin made from phenol and formaldehyde.

It has been found that such a resin continues to polymerize after being placed on the fibrous material base such as the yoshino sheet. Such further polymerization causes the sheet to become hard and, therefore, not efficient, and in that condition is unsatisfactory as a stencil sheet. The market demand is for an efficient stencil sheet that is operable throughout an extended period of time. The synthetic resin of the present invention prepared as herein above set forth is one which substantially fully avoids this phenomenon of continued polymerization, such resin being after application to the yoshino base, stable and in particular substantially incapable of further polymerization.

Resins which in the course of their production have been so treated as to have substantially completed the process of polymerization are herein termed stable resins for the purpose of this invention and this expression will be used to distinguish from the incompletely polymerized resin of the prior art as herein above referred to.

For the purpose of the disclosure herewith there is excluded a class of organic substances, some of which may possess the properties of synthetic resins and which may in some instances be produced by a process kindred to those mentioned in this application, but which in addition have the property of being elastic, after the manner of rubber and the rubber substitutes, such substances having been disclosed in a co-pending application.

What I claim is:—

1. A type-impressible stencil sheet, including a base of fibrous material of open texture having a stencilizable coating characterized by the presence therein of a fully stabilized synthetic resin.

2. A type-impressible stencil sheet, including a base of fibrous material of open texture having a stencilizable coating characterized by the presence therein of a synthetic resin fully stabilized by complete polymerization.

3. A type-impressible stencil sheet, including a base of fibrous material of open texture having a stencilizable coating characterized by the presence therein of a fully stabilized synthetic resin, soluble in an organic solvent.

4. A type-impressible stencil sheet, including a base of fibrous material of open texture having a stencilizable coating characterized by the presence therein of a fully stabilized and fully polymerized synthetic resin which is soluble in an organic solvent.

5. A type-impressible stencil sheet, including a base of fibrous material of open texture having a stencilizable coating characterized by the presence therein of a fully stabilized phthalic anhydride-glycerin resin, substantially as set forth.

6. A type-impressible stencil sheet, including a base of fibrous material of open texture having a stencilizable coating characterized by the presence therein of a fully stabilized synthetic resin, and a tempering agent.

7. A type-impressible stencil sheet, including a base of fibrous material of open texture having a stencilizable coating characterized by the presence therein of a fully stabilized synthetic resin, and a suitable modifying agent.

8. A type-impressible stencil sheet, including a base of fibrous material of open texture having a stencilizable coating characterized by the presence therein of a fully stabilized synthetic resin, a tempering agent and a halogenated hydrocarbon.

9. A type-impressible stencil sheet, including a base of fibrous material of open texture having a stencilizable coating characterized by the presence therein of a phthalic anhydride-glycerin resin, and a tempering agent.

10. A type-impressible stencil sheet, including a base of fibrous material of open texture having a stencilizable coating characterized by the presence therein of a phthalic anhydride-glycerin resin, and a suitable modifying agent.

11. A type-impressible stencil sheet, including a base of fibrous material of open texture having a stencilizable coating characterized by the presence therein of a phthalic anhydride-glycerin resin, a tempering agent, and a halogenated hydrocarbon.

12. A type-impressible stencil sheet, including a base of fibrous material of open texture having a stencilizable coating characterized by the presence therein of a phthalic anhydride-glycerin resin, castor oil, a halogenated hydrocarbon, a waxy substance, and an aldehyde.

13. A type-impressible stencil sheet, including a base of fibrous material of open texture having a stencilizable coating characterized by the presence therein of a phthalic anhydride-glycerin resin, castor oil, a halogenated hydrocarbon, a waxy substance, an aldehyde, and cellulose.

This specification signed this 24th day of March, 1924.

ALEX BROOKING DAVIS.